May 8, 1956

B. K. MURCHISON 2,744,973

CONTROL UNIT FOR TYPE SETTING MACHINE

Original Filed Feb. 21, 1951

INVENTOR
BLACKWELL K. MURCHISON
BY Samuel J. Stree
ATTORNEY

Fig-3.

May 8, 1956 B. K. MURCHISON 2,744,973
CONTROL UNIT FOR TYPE SETTING MACHINE
Original Filed Feb. 21, 1951 7 Sheets-Sheet 6

INVENTOR.
BLACKWELL K. MURCHISON

United States Patent Office 2,744,973
Patented May 8, 1956

2,744,973
CONTROL UNIT FOR TYPE SETTING MACHINE

Blackwell K. Murchison, Brooklyn, N. Y.; Bessie F. Murchison, executrix of said Blackwell K. Murchison, deceased Original application February 21, 1951, Serial No. 212,054. Divided and this application December 12, 1952, Serial No. 325,548

5 Claims. (Cl. 200—46)

This invention relates to new and useful improvements in type setting machines. This is a divisional application based on my co-pending patent application, Serial No. 212,054 filed February 21, 1951.

More particularly, the invention proposes a type setting machine which will set and justify the lines of type, working on one line at a time. It is proposed that this line be proof read, and then reproduced by any known process, such as printing, photography, casting, matrix making, stencil cutting, etc. The individual lines may be reproduced by various types of printing such as contact, photo-engraving reduced to size, black and white, photo-offset, etc. The printing may be done on white paper or other paper, or on thin transparent paper in which case contact transfers may be made by photo prints, blueprints, Ozalid process, Van Dyke process, etc. The new type setting machine will automatically redistribute the type of the line of type after it has been reproduced and then immediately set a new line.

It is proposed to so construct the new type setting machine that it will be 100% automatic operating in a continuous cycle for setting and justifying each line of type and pausing for the reproduction of the line, then redistributing the type and automatically setting the next line. In order to make the machine 100% automatic it is proposed that several control units be used, one to operate a perforated tape which controls selecting the type face and pieces of type, and a second control unit to automatically restart the type setting machine when the reproduction of a line is completed.

An object of this invention resides in the provision of a tape control unit through which perforated tape may pass and which controls the stopping of the rotation of the type support rings in pre-selected positions, depending on the perforations in said tape.

More particularly, it is proposed to perforate the tape with two transverse openings along each longitudinal line of the tape, one of these openings to control selection of the type face, and the other to control selection of the type and type wedges of the selected type face.

Another object of the invention resides in the specific construction of the tape control unit by which the tape may be easily engaged into and removed from its position in the control unit.

It is proposed to characterize the tape control unit by a tape guide front plate and a tape guide back plate which are moved relatively to each other by eccentric means controlled with a motor operating periodically during the operation of the control unit. More particularly, it is proposed that the tape move forward in steps, one step for each line of type to be set and for each step it is proposed that said eccentric action take place.

Another object of this invention resides in the provision of another control unit for restarting the type setting machine each time that the reproducing process used to reproduce the set line has been completed.

For further comprehension of the invention, and of the objects and advantages thereof, reference should be had to the following description and accompanying drawings, and to the appended claims in which the various novel features of the invention are more particularly set forth and also to the specification and drawings of my co-pending patent application Serial No. 212,054 filed February 21, 1951.

In the accompanying drawings forming a material part of this disclosure.

One of the control units of the machine includes a frame 385 having a top 386, sides 387, a bottom 388. This frame also has a horizontal partition 389 spaced a short distance above the bottom 388. A back insulation plate 390 is mounted on the back of the frame 385 and extends between the top 386, the partition 389, and across the sides 387. A front insulation plate 392 is mounted across the frame 385, and extends between the top 386, the sides 387, and the partition 389. This front plate 392 is composed of a plurality of horizontal insulation strips 393 which extend across the sides 387.

Figures 16, 17, 18:
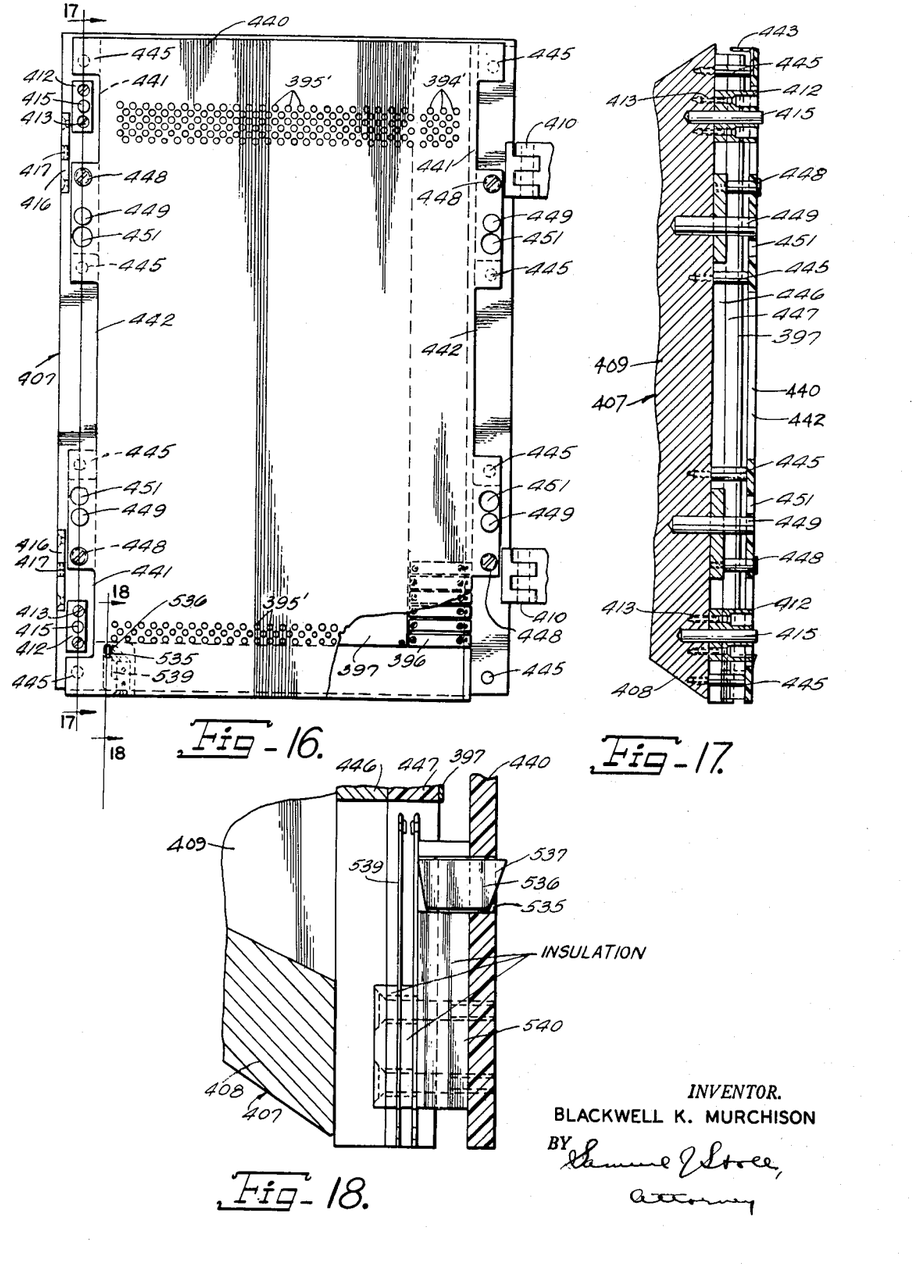
Fig. 16 is a fragmentary elevational view looking in the direction of the line 16—16 of Fig. 2, certain of the parts being broken away to disclose under parts.
Fig. 17 is a fragmentary sectional view taken on the line 17—17 of Fig. 16.
Fig. 18 is a fragmentary enlarged sectional view taken on the line 18—18 of Fig. 16.

A plurality of contact pins are slidably mounted upon and through the insulation plates 390 and 392. These contact pins are divided into two groups consisting of a plurality of pins 394 forming one of the groups and a plurality of pins 395 forming the second group. These groups may be distinguished from each other by examining Fig. 16. The pins 394 are complementary to and engageable with group selector contact plates 396 and the secondary pins 395 are complementary to and engageable with a type selector contact plate 397. These plates will be later on further defined.

Each of the contact pins 394 and 395 is resiliently urged in one direction. For this purpose a collar 398 is mounted on each of said contact pins at a position to the back of the front plate 392. Springs 399 are coaxially mounted on the contact pins 394 and 395 and act between these collars 398 and the back plate 390 for urging the contact pins forwards to positions in which the collars 398 engage the front plate 392. Vertical insulation strips 400 are mounted upon the sides 387 and extend to the back of the frame 385. These vertical insulation strips 400 are provided with horizontal slots 401 extended inwards from their back edges. Horizontal pairs of insulation strips 402 and 403 are mounted across each of the slots 401. The cable 364 extends along the sides of the insulation strips 400 and the lead from this cable 364 pass through the spaces between the insulation plates 402 and 403 and selectively connect with terminals 405 on these strips. There is one wire for each of the contact pins 394 and 395. Each of the springs 399 has, at its back end, an extension 406 which connects with one of the terminals 405 and in this way each of the wires of cable 364 is connected with one of the springs 399 of the contact pins 394 and 395 so as to electrically connect with said contact pins 394 and 395.

A cover 407 normally extends across the front of the frame 385. This cover 407 has inclined top and bottom portions 408, and sides 409. Hinge lugs 410 are mounted upon one of the sides 409 of the cover 407 and the adjacent side 387 of the frame 385 in order to hingedly mount the cover 407 in position on frame 385. A pair of stop blocks 411 are mounted on the side 387 which is remote from the side 387 provided with the hinges 410. These stop blocks 411 are complementary to and engageable with stop blocks 412 mounted upon the side 409 of the cover 407 which is also remote from the hinge 410. These stop blocks 411 and 412 are secured in position with screws 413. The stop blocks 411 are accurately held in correct positions by dowel pins 414 which have their outer ends set inwards from the faces of the blocks 411. The stop blocks 412 are provided with complementary dowel pins 415 which accurately locate the blocks 412 and which project slight distances from the faces thereof. These dowel pins 415 are adapted to engage in the small spaces of the blocks 411 adjacent the free ends of the dowel pins 414. The blocks 411 and 412 are the dowel pins 414 and 415 act to accurately set the cover 407 upon the frame 385.

Figure 1:
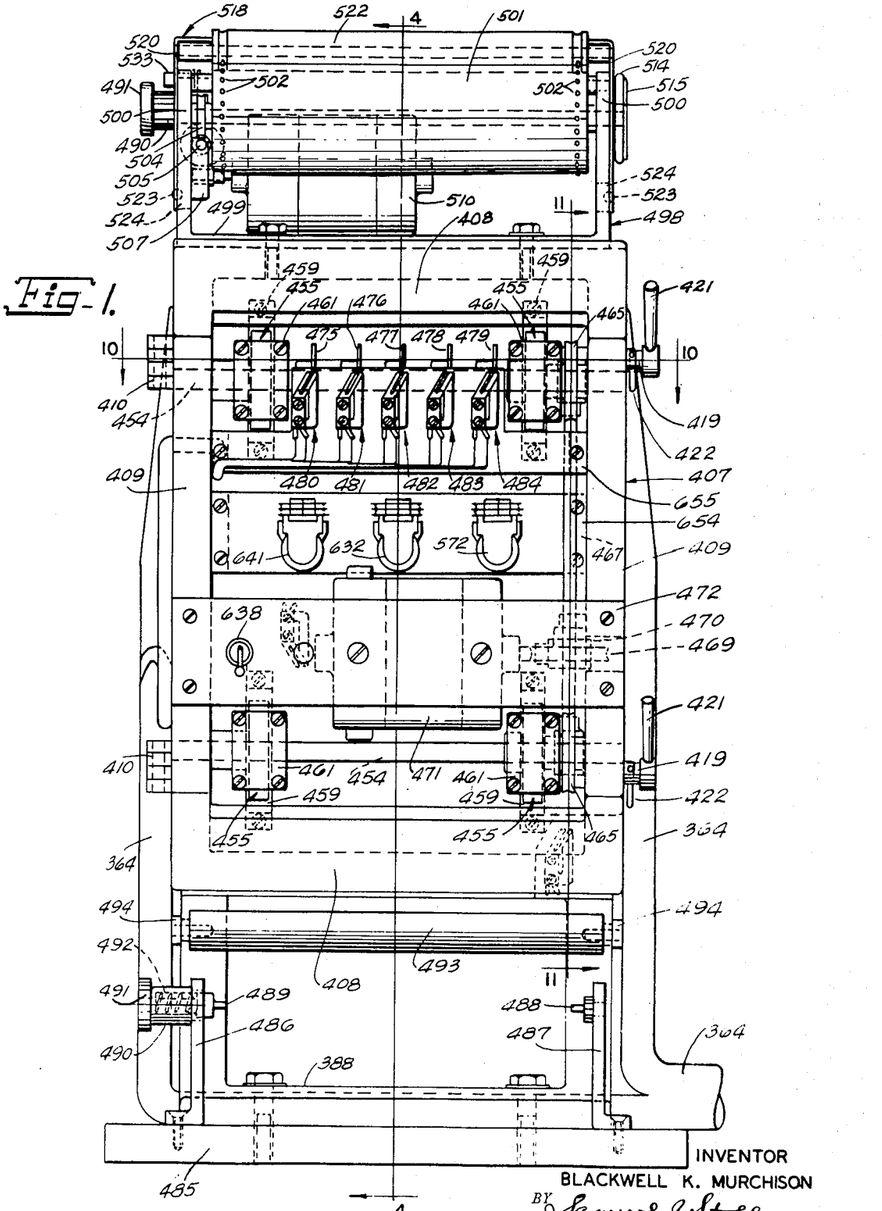
Fig. 1 is an end view of the perforated tape control unit of the type setting machine looking from the left in Fig. 2.
Figures 2, 5, 6, 7:
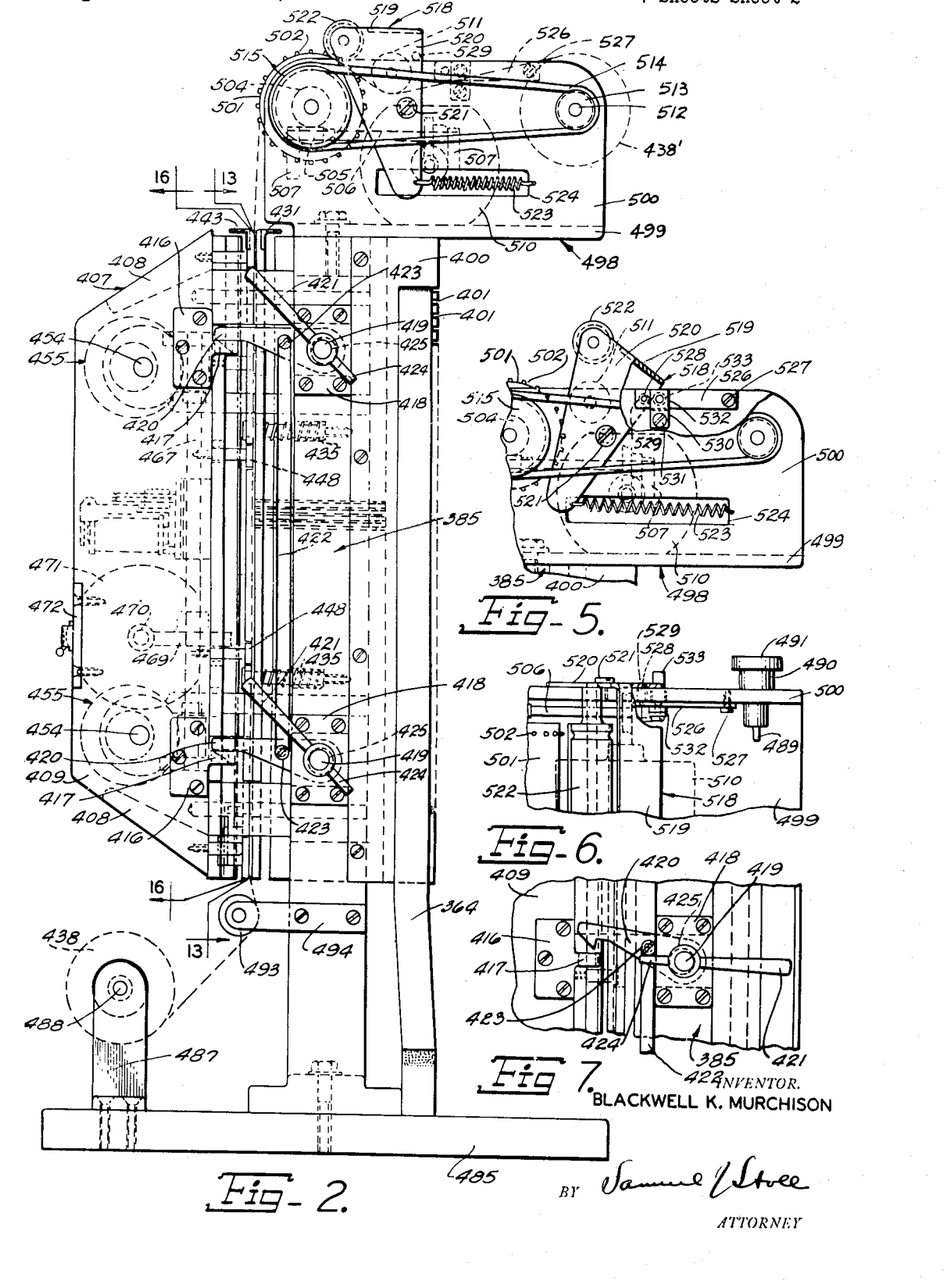
Fig. 2 is a front elevational view of said control unit of the type setting machine.
Fig. 5 is a fragmentary view of the top portion of Fig. 2 but illustrated with certain parts in a different position, some parts being broken away to disclose the interior construction.
Fig. 6 is a fragmentary plan view of a small portion of Fig. 2.
Fig. 7 is a fragmentary portion of Fig. 2, but showing certain of the parts in a different position.
Figure 3:
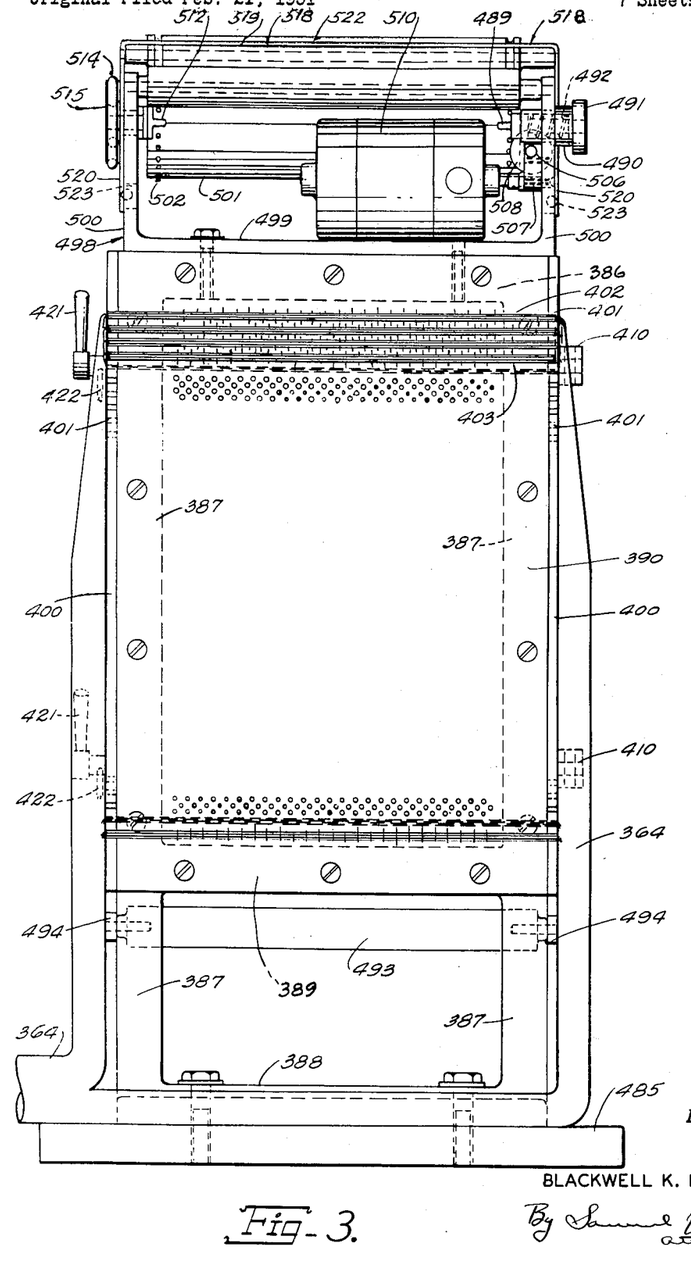
Fig. 3 is an end view looking from the right of Fig. 2.

The cover 407 is associated with means by which it may be latched in its closed position. This means includes lugs 416 mounted upon the frame 407 and provided with keeper openings 417. Brackets 418 are mounted upon the frame 385. Studs 419 are rotatively mounted upon the brackets 418. Hooks 420 are free to turn on the studs 419 and are engageable in the openings 417. Each stud 419 is provided with a handle 421 by which it may be turned. The hooks 420 are connected with each other to move in unison by a connecting rod 422. The ends of the connecting rod 422 are pivotally connected with the hooks 420 by screws 423. The studs 419 are provided with projecting pins 424 which are engageable with the heads of the screws 423 for lifting the hooks 420. The studs 419 are provided with small eccentrics 425 capable of pulling the hooks 420 slightly rearwards for rightly locking the cover 407 in position. In Fig. 2 the latching means is shown in its closed position. In this position the eccentrics 425 are forcing the hooks 420 towards the right so as to firmly hold the cover 407 in position. The handles 421 may be turned clockwise to the positions shown in Fig. 7. While the handles 421 are thus rotated the eccentrics 425 will be turned to move the hooks 420 slightly towards the left. This releases the hooks 420 so that they are free to be lifted. The pins 424 strike the heads of the screws 423 for lifting the hooks 420 to the open position as illustrated in Fig. 7. Now the cover 407 is free to be hinged open. In the closed position of the cover 407 the handles 421 are individually operated to individually cause the eccentrics 425 to move the hooks 420 slightly towards the right to lock the cover 407 firmly in its closed position.

A tape guide back plate 430 is slidably mounted on said frame 385. This plate 430 is provided with a plurality of openings 394' and 395' through which the contact pins 394 and 395 pass. The back plate 430 is an insulation plate. It is provided with a top angle iron 431 to close the space between it and the frame 385 when viewed from the top. The back plate 430 is slidably guided by several dowel pins 432. The dowel pins 432 are mounted upon the sides 397 and extend through the edge portions of the back plate 430. The sliding motion of the back plate 430 is limited by several screws 433. These screws 433 are mounted on the sides 387 and engage through openings along the sides of the plate 430. The side portions of the back plate 430 are reinforced with strips 434. The screws 433 have heads which engage the strips 434 and limit motion of the back plate 430 in one direction. Expansion springs 435 are mounted on the screws 433 and act between the back plate 430 and the sides 387 for urging the back plate 430 outwards against the heads of the screws 433. Several tape guiding strips 436 and 437 are mounted upon the strips 434 and serve to guide the edge portions of the perforated tape 438 which moves across the tape guiding back plate 430 during the operation of the machine.

The cover 407 is provided with a tape guiding front plate 440 which is normally opposed to the back plate 430. This tape guiding front plate 440 is provided with a plurality of apertures 394' and 395' through which the contact pins 394 and 395 may pass. The front plate 440 has cutouts 441 and 442 along its sides into which the guide strips 436 and 437 may engage in order to properly guide the tape 438 between the plates 430 and 440. The front plate 440 is also provided with a top angle iron 443. The front plate 440 is fixedly mounted in position upon the cover 407 by a plurality of stationary studs 445 which are mounted upon the sides 409 of the frame 407 and which engage the inside face of the front plate 440. A movable plate 446 is mounted in between the front plate 440 and the frame 407. This movable plate 446 supports an insulation frame 447 which carries the said group selector contact plates 396 and type selector plate 397 on its face adjacent said front plate 440. Headed screws 448 are mounted upon the movable plate 446. The heads of these screws 448 engage the outside face of the front plate 440. A plurality of dowel pins 449 are mounted upon the frames 407 and pass through openings in the movable plate 446 and the front plate 440. When the cover 407 is moved to its closed position the dowel pins 432 and 449 are in end contact with each other. The back plate 430 is provided with openings 450 into which the headed screws 448 may extend. The front plate 440 is provided with openings 451 into which the headed screws 433 may extend.

Figures 4, 8, 9:
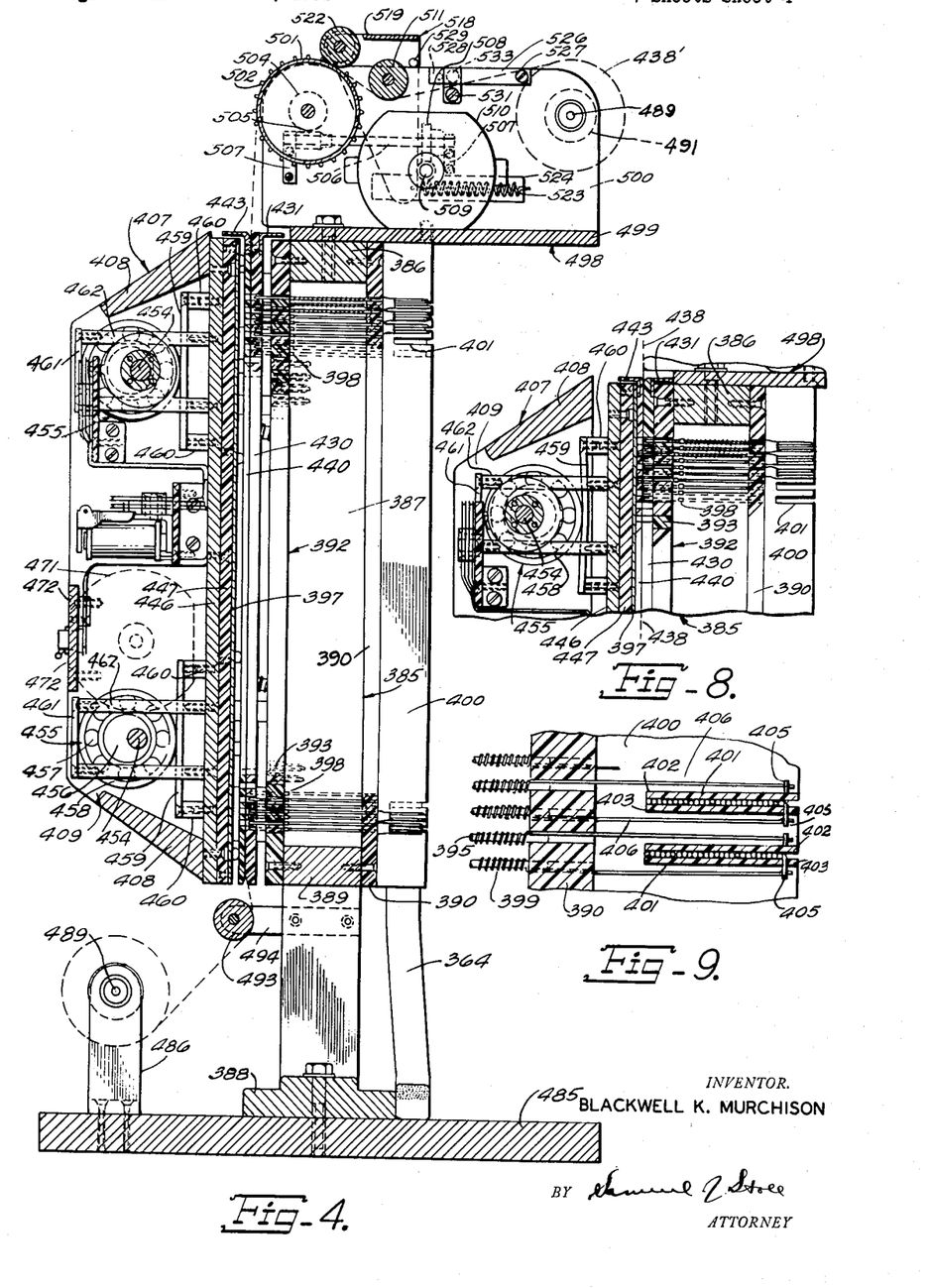
Fig. 4 is a sectional view taken on the line 4—4 of Fig. 1.
Fig. 8 is a fragmentary portion of Fig. 4, but showing certain of the parts in a different position.
Fig. 9 is a fragmentary enlarged detailed portion of Fig. 4.
Figure 10:
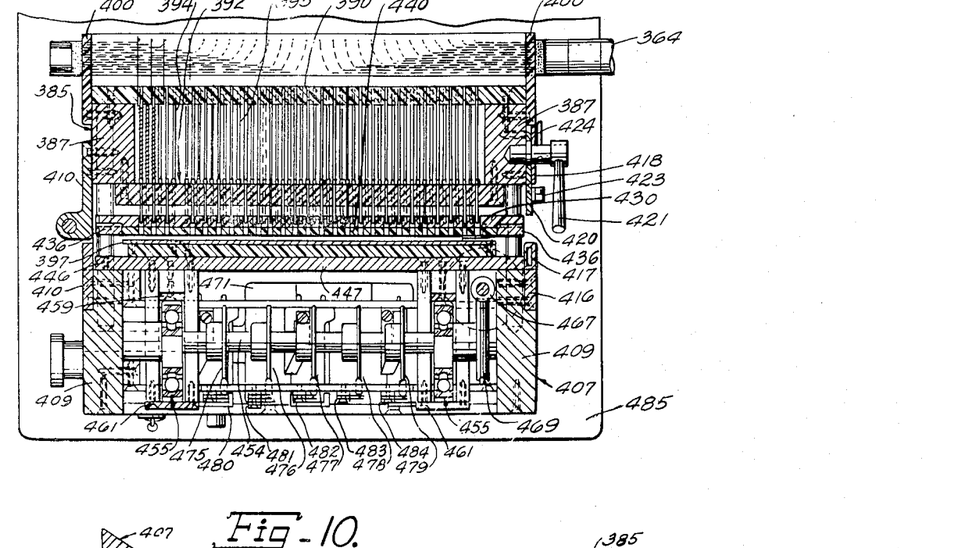
Fig. 10 is a fragmentary horizontal sectional view taken on the line 10—10 of Fig. 1.
Figures 11, 12:
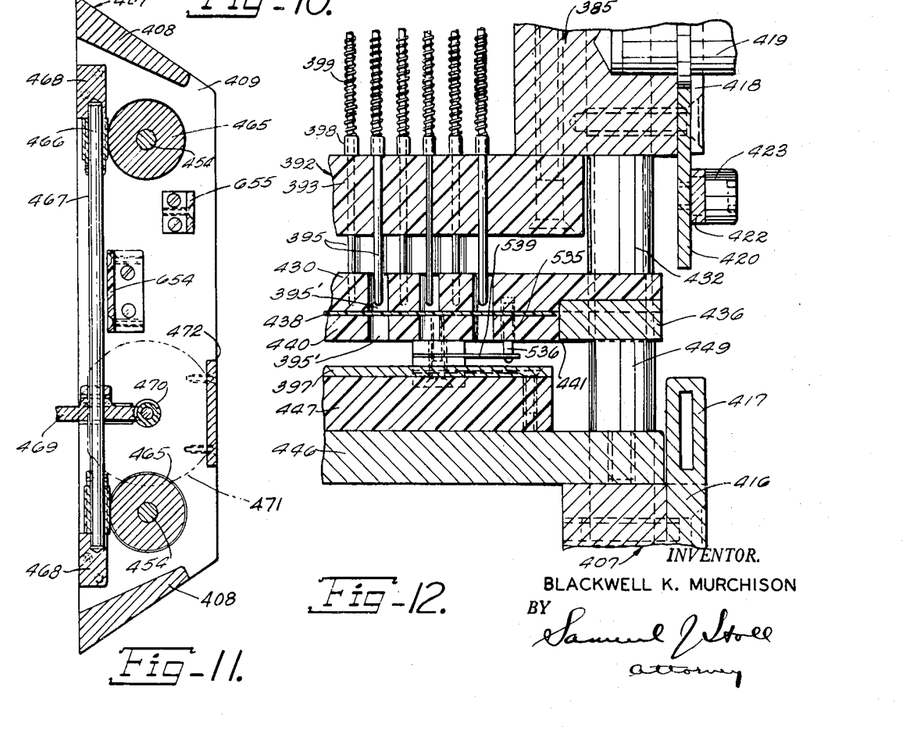
Fig. 11 is a fragmentary sectional view taken on the line 11—11 of Fig. 1.
Fig. 12 is a fragmentary enlarged detailed view of a portion of Fig. 10.
Figure 13:
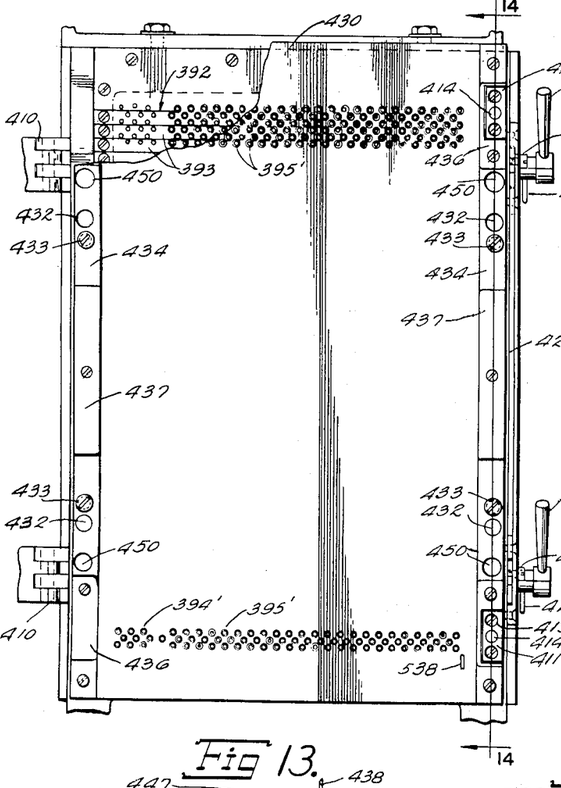
Fig. 13 is a fragmentary elevational view of a portion of Fig. 2 looking in the direction of the line 13—13 thereof, a portion of this figure being broken away to disclose interior parts.
Figure 14:
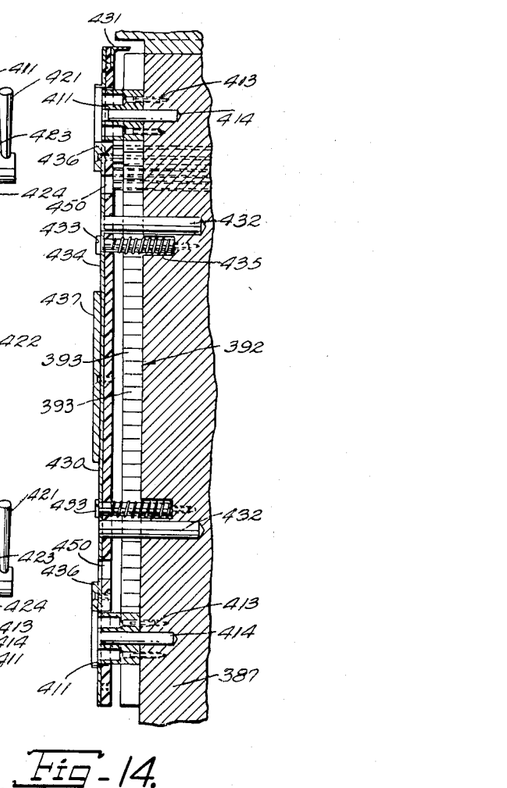
Fig. 14 is a fragmentary sectional view taken on the line 14—14 of Fig. 13.

The movable plate 446 which carries the group selector contact plates 396 and the type selector contact plate 397 is associated with eccentric means for forcing said contact plates 396 and 397 towards the tape guide plates 430 and 440 for engaging the contact pins 394 and 395 with the said contact plates 396 and 397. This eccentric means includes shafts 454 rotatively mounted across the sides 409 of the frame 407. Wheels 455 are fixed on the shafts 454. These wheels 455 are eccentrically mounted on said shafts. The wheels 455 comprise eccentric hub portions 456, ball bearings 457, and outer rims 458. Flexible strips 459 are mounted on the movable plate 446. These strips 459 are free at their centers. At their ends the strips 459 are mounted upon blocks 460 which in turn are mounted on said movable plate 446. The central portions of the strips 459 engage against the adjacent sides of the eccentric wheels 455. The outer sides of the eccentric wheels 455 are contacted by plates 461. These plates 461 are supported upon posts 462, which in turn are mounted on the movable plate 446. In Fig. 4 the eccentric wheels 455 are shown in their left positions in which the various plates between the frames 385 and 407 are separated. When the eccentric wheels 455 turn through 180° to the positions shown in Fig. 8, the various plates between the frames 385 and 407 will be forced together.

Figure 15:
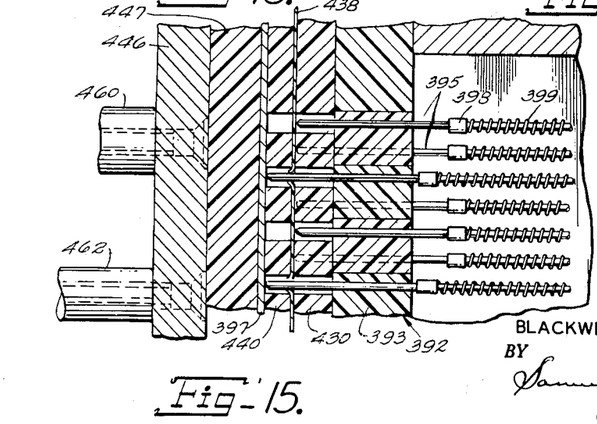
Fig. 15 is a fragmentary enlarged detailed view of a portion of Fig. 8.

In the separated positions of these various plates referred to above the tape 438 is free to pass through the control unit. When the various plates are contacting, as shown in Fig. 8, the contact pins 394 and 395 will engage the tape 438 and those contact pins which align with openings in the tape 438, will extend through the tape 438 and contact the contact plates 396 and 397, as indicated in Fig. 15. The eccentric wheels 455 are operated by an electric motor drive. Each of the shafts 454 are provided with worm wheels 465 which are engaged by worm pinions 466. These worm pinions 466 are fixed upon a shaft 467 rotatively mounted in bearings 468 mounted upon one of the sides 409. The shaft 467 is provided with a worm wheel 469 which meshes with a worm pinion 470 upon the shaft of a drive motor 471. This drive motor is mounted upon a support plate 472 which is mounted across the sides 409 of the frame 407. The motor 471 is capable of indirectly driving the shafts 454 so as to operate the eccentric wheel 455.

Cams 475, 476, 477, 478 and 479 are fixedly mounted on one of the shafts 454. These cams respectively operate switches 480, 481, 482, 483 and 484. The functions of these cams and switches will be covered further on in this specification.

The frame 385 is mounted on a base 485. This base is provided with a roll support comprising a pair of opposed stationary brackets 486 and 487. A pivot 488 is mounted on a bracket 487. A retractable pivot 489 is mounted on a bracket 486. This retractable pivot 489 slidably extends through a tubular housing 490 mounted on the bracket 486. The outer end of the pivot 489 is provided with a head 491 by which it may be moved. A spring 492 is mounted in the tube 490 and normally maintains the pivot 489 in its extended position. A roll of tape 438 may be mounted between the pivots 488 and 489, as indicated by the dot and dash line 438 in Fig. 2. A tape guiding roll 493 is mounted upon brackets 494 mounted on the sides 387 of the frame 385. This guiding roll 493 is located at the bottom of the tape guide plates 430 and 440.

A bracket 498 is mounted on the top of the frame 385. This bracket 498 has a bottom 499 and side arms 500. A drum 501 is mounted between the side arms 500 in a position in which the tape 438 may engage over the top thereof. This drum 501 is provided along its side with pins 502 for engaging corresponding openings 503 formed along the edge portions of the tape 438. The shaft of the drum 501 is provided with a worm wheel 504 which is engaged by a worm pinion 505 on a rotatively mounted shaft 506. This shaft 506 is rotatively supported in bearings 507 mounted upon one of the sides 500. The shaft 506 is provided with another worm wheel 508 engaged by a worm pinion 509 on the shaft of a drive motor 510. The motor 510 is mounted upon the bottom 499.

A guide roller 511 is mounted across the sides 500 adjacent the top portion of the drum 501. The tape 438 is intended to engage under this roller 511. The tape then continues and engages upon a roll 438' which is mounted between a rotative peg 512 mounted on one of the walls 500, and a retractable peg 489 mounted on the other wall 500. This retractable peg 489 engages through a tubular member 490 mounted on the other wall 500. The outer end of peg 489 is provided with a head 491. Within the tubular member 490 there is an expansion spring 492. The outer end of peg 512 is provided with a wheel 513 which is engaged by a belt 514 engaging over a wheel 515 mounted on the shaft of the drum 501. Rotations from the drum 501 will be transmitted by the belt 514 to drive the peg 512, which in turn will wind up the roll of tape 438'.

An inverted U-shaped bracket 518 is pivotally mounted across the top of the bracket 498. This bracket 518 has a top 519 and sides 520. Pivot screws 521 pivotally support the sides 520 upon the walls 500. A counter-pressure roller 522 is mounted upon the top of the bracket 518 and is engageable against the drum 501 in order to hold the tape 438 against the drum so that the perforations 503 maintain engagement with the pins 502. The bottom end portion of the arms 520 connect with tension springs 523. These tension springs 523 pass through openings 524 formed in the walls 500. The springs 523 are connected between the walls 500 and the sides 520 in order to resiliently engage the roller 522 against the drum 501.

A latch is provided for holding the bracket 518 in an inoperative position. This latch comprises a leaf spring 526 mounted on the inner face of one of the walls 500. The leaf spring 526 is fixedly held at one end by a screw 527. The other end of leaf spring 526 is provided with a peg 528 which passes through an opening in the side walls 500 and which is engageable in a complementary opening 529 formed in one of the sides 520 of the bracket 518. A stop bracket 530 is attached to the wall 500 adjacent the free end portion of the spring 526. This stop bracket 530 is secured in place with a screw 531. The top portion 532 of bracket 530 is spaced slightly from the spring 526 so that the spring 526 may be flexed towards the bracket 530 to disengage the peg 528 from the opening 529. A push button 533 is mounted on the spring 526 and extends through an opening in the side 500 and is adapted to be pushed inwards to flex the spring 526 in order to open the latch. Fig. 5 illustrates the bracket 518 held by the latch. The button 533 may be pressed to release the bracket 518.

The tape guide front plate 440 is provided with a small rectangular opening 535 at a point below the contact plates 396 and 397. This opening 535 is arranged along one side of the tape guide plate 440 outside of the area of the openings 395'. A line stop cam 536 is slidably mounted in this opening 535. This cam 536 has an inclined projecting edge portion 537 which is adapted to engage the tape 438. The tape guide plate 430 is provided with an opening 538 complementary to the opening 535 into which the line stop cam 536 may extend when said tape guide plates are in contact with each other. The line stop cam 536 controls a switch 539 mounted on a block 540 attached to the tape guide plate 440. The tape 438 is provided with a line of slots 541 along one edge portion through which the line stop cam 536 may extend. Normally, the tape 438 maintains the line stop cam 536 in depressed condition in which the switch 539 is closed. However, each time that the tape 438 reaches a point in which one of the openings 541 aligns with the cams 537 the latter element is freed and the resiliency of the switch 539 forces the cam 536 through the opening 541 of the tape 438 so that the switch 539 becomes opened. The tape 438 is moved in a direction so that it engages against the inclined end 537 of the cam 536 for depressing the cam in order to close the switch 539.

The primary contact pins 394 and the secondary pins 395 are arranged in groups in which each group comprises primary contact pins 394 and secondary contact pins 395 in straight transverse lines across the tape 438. There is one of these transverse groups for each type support ring 38. In the drawing two of the type support rings 38 and two of the groups of the contact pins 394 and 395 have been illustrated in full lines. However, it should be understood that forty of these groups are required, if the machine is to operate with forty characters to the line, and other numbers are required if there are to be other numbers of characters to the line. The tape 438 has cooperating groups of openings 542 through which the contact pins 394 and 395 may extend, there being two openings for each group of these pins, namely, one opening for one of the primary pins 394 and one opening for one of the secondary pins 395. The opening for the contact pin 394 will control the selection of the type face, that is, it will control the stopping of a type support ring 38 in one of the sectors of ring 38 bearing one face of type. The one opening for the pin 395 will control the stopping of the type support ring 38 at one particular piece of type of the selected type face. The tape 438 is formed with a plurality of the openings 542 along its length and the openings 542 between each adjacent pair of the line stop openings 541 will control the position of stopping of all the type support rings 38. For each type support ring 38, the brushes 366' and 365' thereof, are individually connected with the pins 394 of one transverse group of pins by leads 543. For each type support ring 38 the group of stationary contacts 360 are individually connected by leads 544, with the individual contact pins 395 of its corresponding transverse group of contact pins. The primary contact pins 395 for each type support ring 38 are associated with means for connecting them with their respective group selector brushes 365. This means includes leads 545 connecting the rail contact 363' with alternate brushes 365 and a lead 546 connecting the contact rail 364' with the remaining alternate brushes 365.

In the particular design of the machine as illustrated on the drawings there are six brushes 365 to represent six different faces of type for each type support ring 38. These six brushes 365 are arranged approximately equal distances from each other, approximately 60° apart. The group of stationary contacts 360 for each type support ring 38 is arranged in an angular space of about 60°. The contact rails 363' and 364' also extend through angular distances of 60°. With this arrangement each of one of the six primary contact pins 394 of each group for each type support ring 38 will control one of the brushes 365, in conveying an electric current to one of the contacts 360. This will be better understood by noting that for each ring 38 one primary contact pin 394 of a transverse group of pins may pass through one opening 542 of the tape 438 and engage one of the contact plates 396. A current may now flow from the contact plate 396 through one of the leads 543 to one of the brushes 365' or 366'. From one of these brushes current will flow to one of the rails 363' or 364'. From this particular rail current may flow to three alternate brushes 365, but two of these brushes will be in an area outside of the area of the group of stationary contacts 360. There will be but one hot brush 365 for this particular area of the contacts 360 which will represent the selected type face of the particular type support ring 38. This particular hot brush 365 will start passing across the contacts 360 until it reaches that contact 360 which is connected with the secondary contact pin 395 engaging through the second opening 542 of the two openings for each type support ring 38. This particular contact pin 395 will connect with the contact plate 397 for closing the circuit through the particular contact 360.

It should be recalled that each type support ring 38 is driven by an electric motor 80. Each motor 80 is controlled in the following way. A main switch 550 controls the supply of electric current from some source to a first lead 551 and a return lead 552. The first lead 551 connects with a lead 553 which includes in series the switch 554 of a relay 555. The lead 553 then continues and connects with one terminal of each of the motors 80. A return lead 556 connects with the other terminal of each motor 80 and passes through a switch 557 of a relay 558. The lead 556 continues from the switch 557 to a stationary contact 559. This stationary contact 559 is engaged by a movable contact 560 mounted on the movable core 355 of the solenoid 356 of the particular type ring 38 driven by a particular motor 80. From the movable contact 560 a lead extends to the return lead 552. A resistance 561 shunts each switch 557 at a point which connects the stationary contact 559 in parallel with the switch 557 and resistance 561. The first lead 551 also connects in series with a switch 563 of a relay 564 and then continues through the coil of the solenoid 356 to a contact 565 also mounted on the movable core 355 of the solenoid 356 of said particular type ring 38. For each solenoid 356 there is a stationary contact 566 cooperative with movable contact 565 through which the circuit continues through the switch 567 of a relay 568. From the switch 567 the circuit continues to the return lead 552. The first lead 551 and return lead 552 supply current to a transformer 569. The first lead 570 from the transformer 569 connects in series with a switch 571 of a relay 572. The switch 571 connects with the contact plate 397. For each type ring 38, a lead 573 from one contact plate 396 connects with the coil of its relay 568 and then through a second switch 574 of said relay 568. From this second switch 574 the circuit continues through the coil of the relay 558 and through a second switch 575 of the relay 558. This second switch 575 controls the connection of the coils of the relays 558 and 568 in parallel. This second switch 575 is also engageable with a contact 576 connected by a lead 577 with a tap to the center of the secondary of the transformer 569.

Each stationary group of contacts 360 has several auxiliary contacts 360' to its front. As illustrated in the drawing there are four such additional contacts. Each of the contacts 360' are connected with shunt lines 571' which include a resistance 572'. These shunt lines 571' connect each contact 360' or 360 with the fifth contact further on. The type support rings 38 when driven rotate clockwise. With this arrangement when a "hot" brush 365 comes along it first engages the contacts 360' and when it is in a position four contacts ahead of the "hot" contact 360, a current will flow through the lead 544 of the "hot" contact 360 but this current will be reduced by one of the resistances 572'.

The circuits used in stopping each motor 80 may be understood from the following: Current from the lead 570 will be supplied through the switch 571, when closed, to the contact plate 397. From the plate 397 the circuit continues through one of the contact pins 395 for each type support ring 38. For each type support ring 38 the current flows from one of the contact pins 395 through one of the resistances 572' and contacts 360' or 360 to the "hot" brush 365 and then through one of the rails 363' or 364' to one of the brushes 365' or 366', through one of the leads 543 and to one of the contact pins 394. The current then continues from the particular contact pin 394 to one of the contact plates 396 to lead 573 through the coils of the relays 568 and 558 to the return lead 589 of the transformer 569. However, the relay 568 is designed to require more current for its operation than is now flowing, so this relay 568 will not be affected and will remain in the position illustrated. The relay 558 is designed to be affected by the current now flowing so that the switches 557 and 575 are thrown to their second positions. The switch 575 will engage the contact 576 so that current will flow through the tap lead 577. This flow of current will maintain the relay 558 in its thrown position. In the thrown position of the relay 558 the switch 557 was opened and opened the shunt across the resistance 561. Current now flows through this resistance 561 cutting down the flow of current through the electric motor 80 and slowing up the motor 80. Each motor 80, in like manner, therefore drives its type ring 38 at a slower rate of speed.

In a short while the hot brush 365 will make contact with the hot stationary contact 360. Full strength current will now flow through the particular lead 544 so that full current now flows through the coil of the relay 568. This relay is therefore actuated and its switches are thrown to their second position. Switch 567 will now supply the coil of the solenoid 356 with current which will flow from the lead 551 through the switch 563, when this switch is closed, through the coil of the solenoid 356, through the contact 565 carried by the core 355, the contact 566, the switch 567, and the return lead 552. The core 355 of the solenoid 356 therefore is moved and the brake rack 353 will engage the teeth 47 and lock the type support ring 38 in its selected position. When the switch 574 is thrown to its second position the circuit through the holding relay 558 is opened and this relay will return to its initial position as illustrated in the drawing. When the core 355 of the solenoid 356 moved, the circuit through the electric motor was opened at the contacts 559 and 560. The solenoid 356 will maintain its locking position because the circuit through its coil was closed when the core 355 of the solenoid 356 moved to its locking position by the contact 565 engaging contact 573'.

The type setting machine has a second control unit, which is schematically illustrated in the drawing, which is for the purpose of controlling the restarting of the type setting machine after the reproduction of a set line of type by any process. For example, the process may be an actual printing process to print from the set line of type, or it may be photographic process to be used in a photo offset printing process, or it may be a process for the actual production of slugs from the set type, or other process. This control unit has a shaft 575 which is driven by an electric motor 576. The shaft 575 is provided with cams 577' and 578 which respectively control switches 579 and 580. It is intended that the shaft 575 perform a complete revolution of 360° during the printing, photographing or other reproduction of the line of set type. The motor 576 is controlled by an electric circuit including in series a main switch 581 and the switch 582 of a relay 583. The coil 584 of the relay 583 is controlled by the switches 380 and 580. The first lead 589 is connected in series with the coil 584 which is connected in series with the switch 380 which connects to the return lead 570. The cam 377 has one projection 586 which closes the switch 380 to energize the relay 583 in order to start the motor 576 for the printing, photographing or other type copying operation. The cam 578 has one notch 587 which closes the switch 580, which takes over the operation of the relay 583 after the projection 586 releases the switch 380. The circuit may be traced from the lead 589 through the coil 584, through the switch 580, to the return lead 570. When the printing, photographing or other type copying process has been completed the shaft 575 will have turned 360° so that the switch 580 is opened to release the relay 583 in order to stop the electric motor 576.

The electric motor 107 is controlled by a relay 590. This relay 590 has a switch 591 in series with the motor 107 which is electrically connected with the leads 551 and 552. The coil 592 of the relay 590 is connected in series with the switch 579 which is closed by a projection 593 on the cam 577'. The circuit continues from the switch 579 through the switch 372 which is controlled by a pair of projections 594 on the cam 370. These projections 594 are located 180° from each other. The circuit continues from the switch 372 along the lead 595 to a stationary contact 596 which is engageable by a movable contact 597 mounted upon one of the cores 355 of one of the solenoids 356. Each solenoid 356 has a corresponding stationary an movable contact forming a series of switches schematically indicated by the reference numerals 598. The last stationary contact 596 of the series of switches 598 is connected with the return lead 570 of the transformer 569. It should be noted that the relay 590 is therefore controlled by the switches 579, 372 and 598 which are all connected in series. Consequently, when the control unit illustrated in the drawing is in its starting position, the position illustrated, and the shaft 264 is in the position illustrated in the drawing, so that the switch 372 is closed, the electric motor 107 will be started immediately upon the closing of the last switch 598. In other words, after all of the solenoids 356 are energized and their cores have been raised, then the electric motor 107 will start operating.

The relay 555 controls the operation of the motors 80. The coil 600 of the relay 555 is connected in series with the bottom section 601 of the switch 378. The switch 378 is controlled by one niche 602 formed in the cam 374. When the cam shaft 102 of the type setting machine is in its starting position, the position illustrated in the drawing, the switch 378 engages the niche 602 so that the switch section 601 is closed. A circuit now exists from the lead 589 through the coil 600, the switch section 601 to the return lead 570. The relay 555 is therefore energized and its switch 554 is closed so that the motors 80 are in operative conditions. As soon as the shaft 102 turns, the switch section 601 will be opened and the motors 80 will stop. The switch 378 has a top switch section 603 which closes when the switch section 601 opens. This top section 603 takes over the duty of the top switch section 604 of the switch 481. The switch 481 is operated by the cam 476 which has one projection 605 to operate the switch 481. The top switch section 604 functions to close the relay 564. The circuit may be traced from the lead 589 through the coil 606 of the relay 564 through the switch section 604 to the return lead 570. When the switch section 604 opens, the relay 564 may still be energized because another circuit exists from the lead 589 through the coil 606 of the relay 564 and through the switch section 603 to the return lead 570. The switch 481 also has a lower switch section 607 which controls the relay 572. The relay 572 has a coil 608 which is connected in series with the first lead 589, the switch section 607, and the return lead 570. It will therefore be seen that when the bottom switch section 607 is closed the relay 572 will be energized so that the switch 571 is closed and an electrical potential is supplied to the contact plate 397.

The motor 270 is controlled by a relay 610. This relay has a switch section 611 which is connected with the current supply leads 551 and 552. The switch 611 is controlled by the coil 612 which is connected in series with the central movable contact arm 613 of switch 373. The contact arm 613 is provided with a projection 614 which engages the cam 371. This cam has a high section 615 and a low section 616. The switch 373 has a bottom switch section 618 and a top switch section 619. The switch 373 is electrically connected with the switch 379. Said switch 379 has a central movable contact 620 provided with a projection 612 engaging the cam 375 which has a high section 622 and a low section 623. The switch 379 has a bottom switch section 624 and a top switch section 625. The movable contact arm 620 of the switch 379 is connected with the return lead 570. As illustrated in the drawing the bottom switch sections 618 and 624 are closed. In this position the motor 270 is inoperative. When the cam 375 is turned around so that the high section 622 opens the switch section 624 and closes the switch section 625, a circuit will be closed through the coil 612, the bottom switch section 618, and the top switch section 625 which causes the motor 270 to operate until the cam 371 turns around so that the high cam section 615 throws the switch 373 to open the bottom section 618 and close the top section 619. Now a circuit exists through the coil 612, the top switch section 619, and the bottom switch section 624, provided of course that the bottom switch section 624 is reclosed by the cam 375.

The cam 376 controls the starting position of the type setting unit. This cam 376 has a high spot 626, a low spot 627, and the remainder of the cam surface is neutral. The switch 381 operated by the cam 376 has a top switch section 628 and a bottom switch section 269. The high spot 626 closes the top switch section 628, while the low spot 627 closes the switch section 629. In the remaining portion of the cam 376, the switch 381 is in a neutral position in which the switch sections 628 and 629 are both open. The electric motor 471 of the tape control unit is controlled by a relay 632. This relay has a coil 633. The coil 633 is connected in series with the bottom section 629 of the switch 381. The circuit may be traced from the lead 589 through the coil 633 and the lead 634 which connects through the switch section 629 to the lead 570. It will thus be seen that the cam 376 is capable of operating the relay 632.

The high spot 626 of the cam 376 represents the starting position of the type setting machine and this position is checked by the cam 477. This cam 477 has one niche 636 which controls the opening of the switch 482. A circuit exists from the lead 589 through the coil 633 and through the switch 483 when this switch is closed to the lead 637 which connects to the return lead 570 through the switch section 628. The circuit from the coil 633 may also pass through the switch 483 when closed, and the switch 482 to the return lead 570. The tape control unit shown in the drawing will cease operation by its motor 471 stopping in the event that the switch 482 opens and the switch section 628 is also opened. In this condition of the machine the tape control unit will not start until the type setting machine reaches the starting position in which the high spot 626 of cam 376 closes the switch section 628.

The electric motors 471 and 510 receive current through the main switch 638. The circuit of the motor 471 includes the switch section 639 of the relay 632, in series. The circuit of the motor 510 includes the switch section 640 of a relay 641, in series. The relay 641 has a coil 642. The relay 641 has another switch section 643 which operates simultaneously with the switch section 640. When current flows through the coil 633 of the relay 632 the motor 471 operates. When current flows through the coil 642 of relay 641 the motor 510 operates. The cam 475 controls the relay 641. This cam 475 has a high spot 645 which is capable of closing the switch 480. When this switch 480 is closed an electric circuit extends from the lead 589 through the coil 642, the switch 480 to the return lead 570. The cam 478 stops the motor 471 at certain times. This is accomplished by two low spots 647 in the cam 478 opening the switch 483. These low spots are 180° from each other. When the switch 483 opens the circuit is opened through the coil 633 of the relay 632 which stops the motor 471. A push button switch 625 shunts switch 483. The motor 471 is started by the cam 479. This cam has one high spot 650 which closes the switch 484. When this switch 484 is closed a circuit will extend from the lead 589 through the coil 633, the switch 484, through the switch section 643 to the return lead 570.

The panel board 340 is also used to support the various relays of the setting machine. Note particularly the relays 567 and 568. In the tape control unit a panel board 654 is mounted upon the frame 407. This panel board 654 supports the relays 641, 632 and 572. Another panel board 655 supports the switches 480 to 484, inclusive. The main switch 638 is illustrated mounted on the panel board 472.

While I have illustrated and described the preferred embodiment of my invention, it is to be understood that I do not limit myself to the precise construction herein disclosed and the right is reserved to all changes and modifications coming within the scope of the invention as defined in the appended claims.

I claim:

1. In a type setting machine, a control unit comprising a frame, a group of primary contact pins slidably mounted on said frame, a group of secondary contact pins slidably mounted on said frame, means for selectively resiliently urging said contact pins outwards, a tape guide back plate slidably mounted on said frame and having openings through which the contact ends of said pins engage, a cover hingedly mounted on said frame, means for latching said cover closed across said tape guide plate, a tape guide front plate mounted on said cover opposed to said back plate and having openings through which the contact ends of said pins may engage, group selector contact plates for selecting groups of type slidably mounted on said cover behind said front plate, a type selector contact plate for selecting a piece of type for a selected group of type slidably mounted on said cover behind said front plate, means for periodically drawing a tape between said back and front plates while in separated positions and including an electric motor drive, and means for forcing said contact plates towards said tape guide plates for engaging said contact plates against said pins.

2. The combination of claim 1, in which said last mentioned means includes a shaft with eccentrics, and an electric motor for driving said shaft.

3. The combination of claim 1, in which the last mentioned means includes a shaft with eccentrics and an electric motor for driving said shaft, said shaft being rotatably mounted on said frame, said contact plates being mounted on a supporting plate and said eccentrics connecting with said supporting plate.

4. The combination of claim 1, including pins slidably supporting said back plate in said frame, and other pins slidably supporting said front plate on said frame.

5. The combination of claim 1, in which the last mentioned means includes a shaft with eccentrics and an electric motor for driving said shaft, said means for periodically drawing said tape including a controlling cam mounted on said shaft which is provided with said eccentrics, and electrically operated means controlled by said cam and operating said motor which operates said means for periodically drawing said tape.

References Cited in the file of this patent

UNITED STATES PATENTS

| | | |
|---|---|---|
| 2,210,382 | Rufle | Aug. 6, 1940 |
| 2,575,052 | Foltzer | Nov. 13, 1951 |